May 24, 1932. L. EGGERT 1,860,022
CONTROL SYSTEM AND APPARATUS
Filed Aug. 30, 1929 6 Sheets-Sheet 1

Inventor
Lewis Eggert
By Wm. O. Belt
atty.

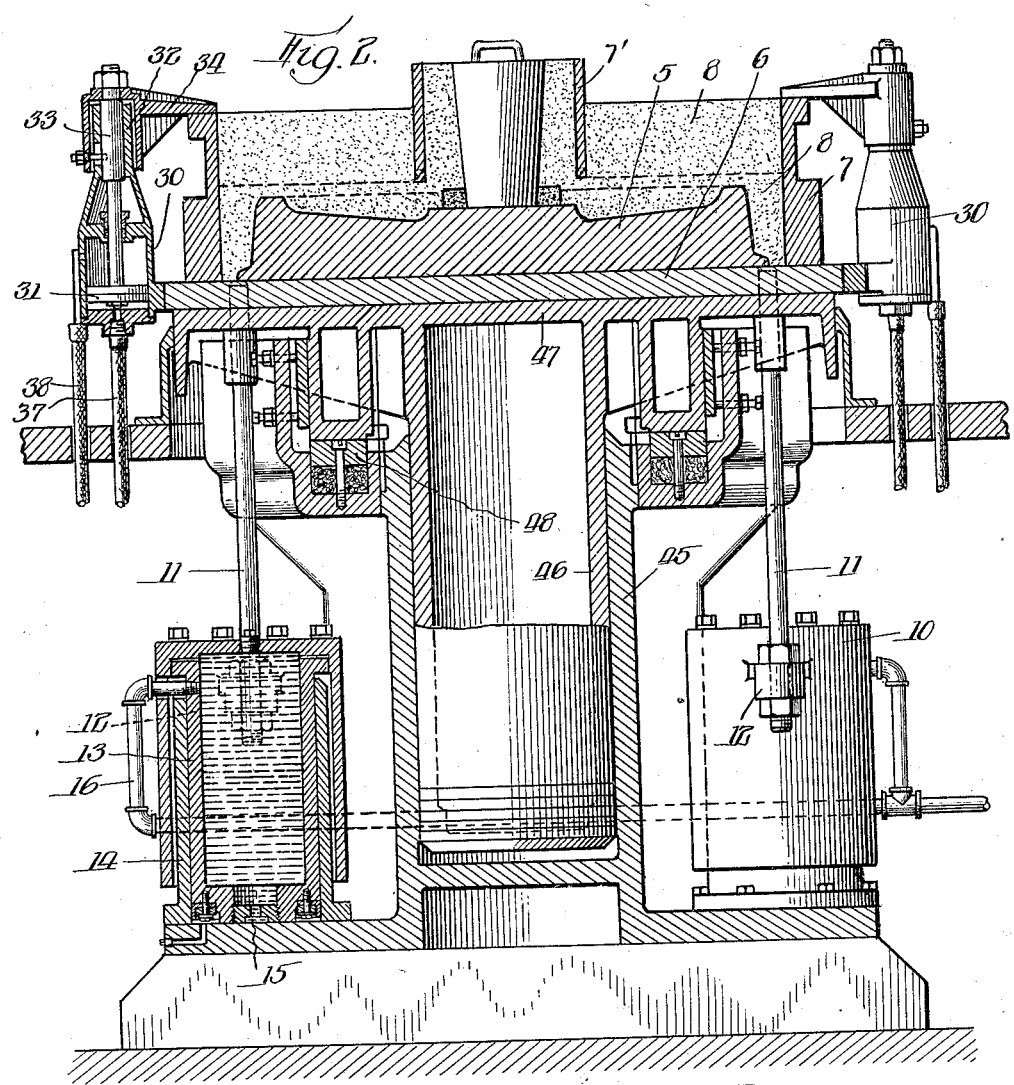

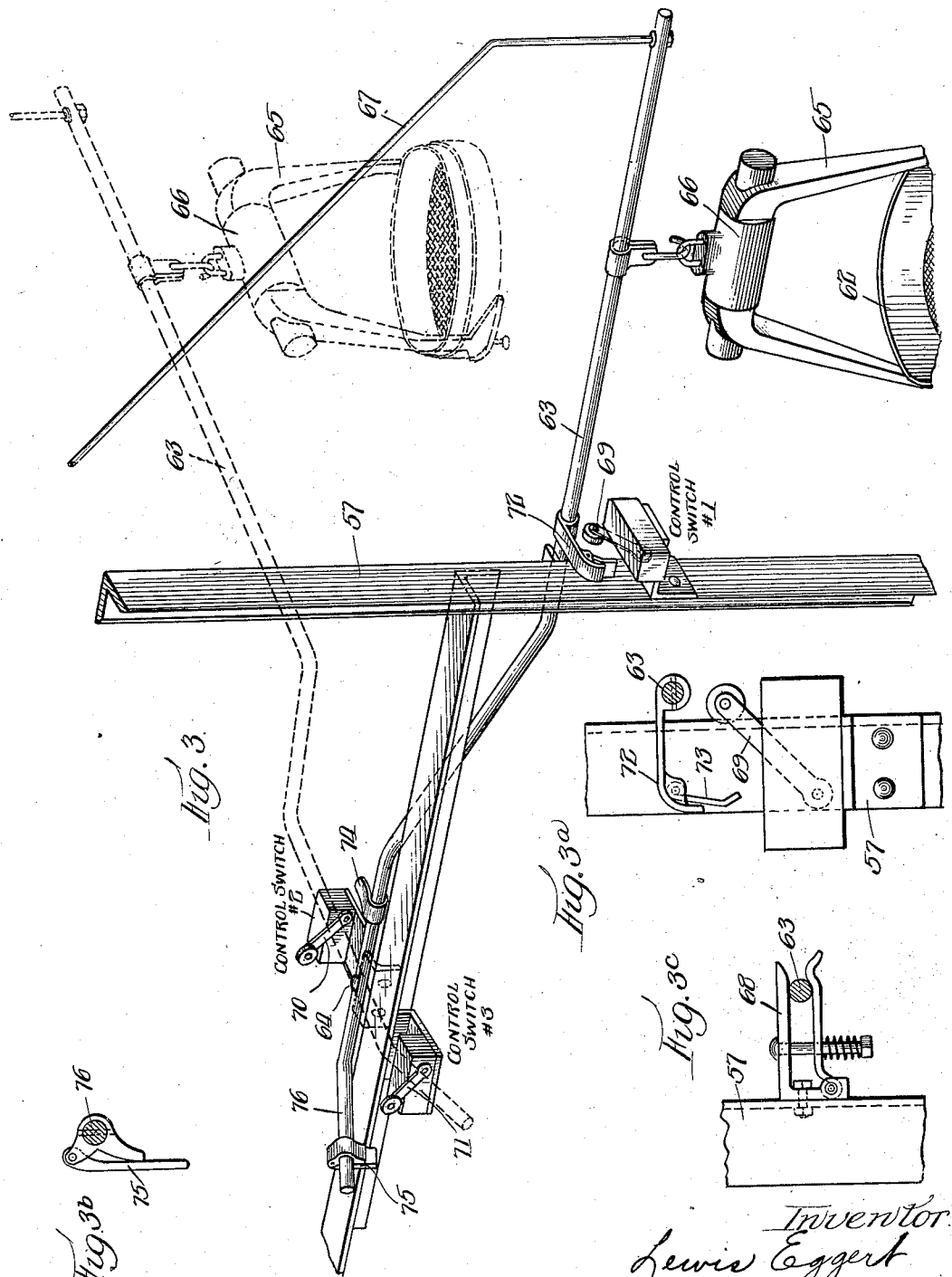

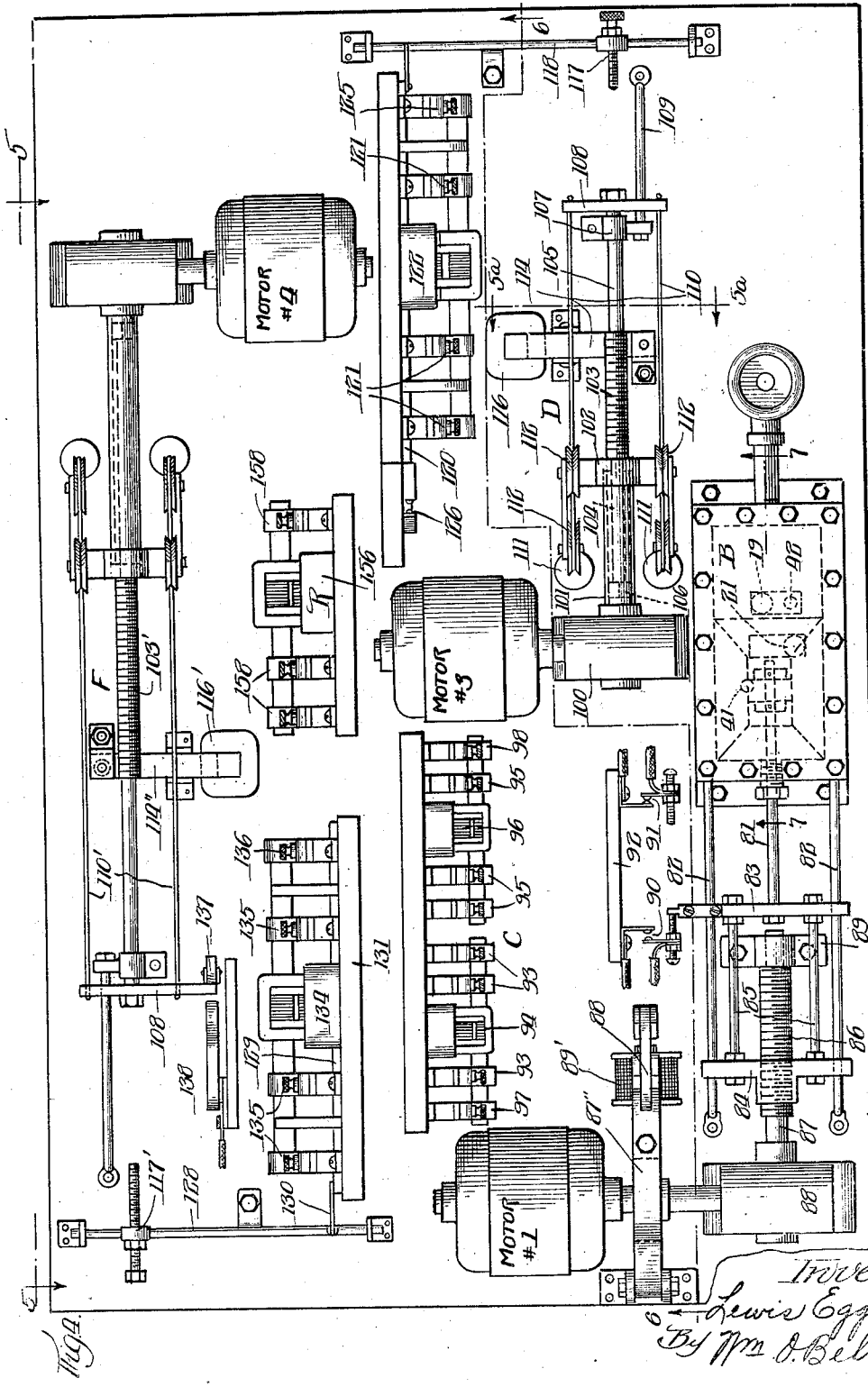

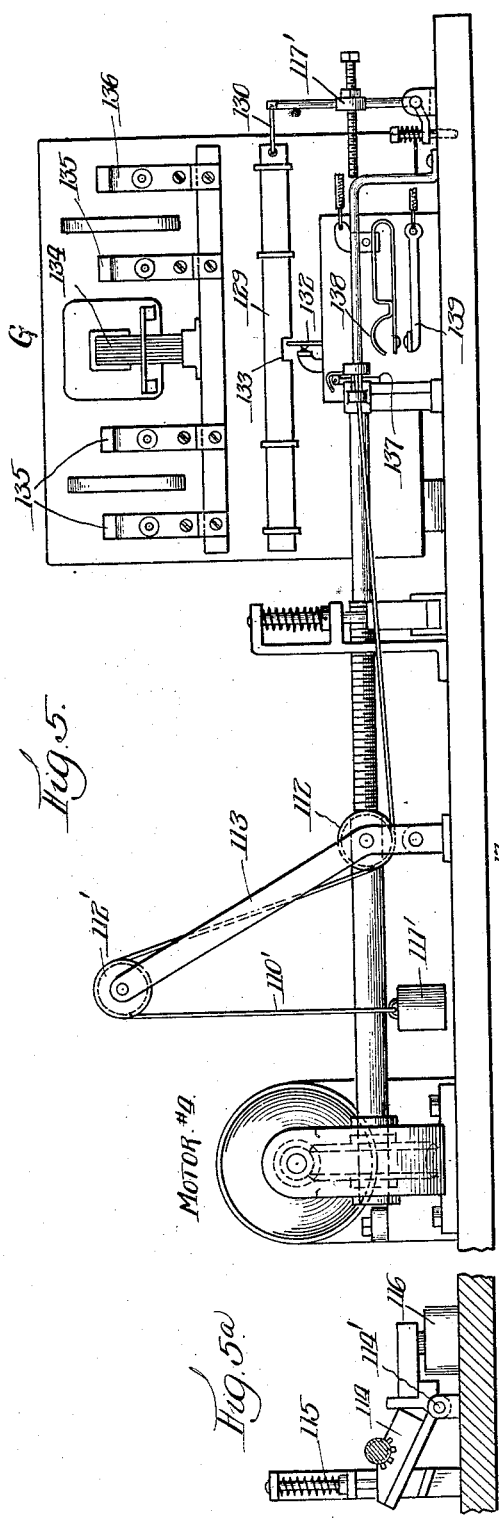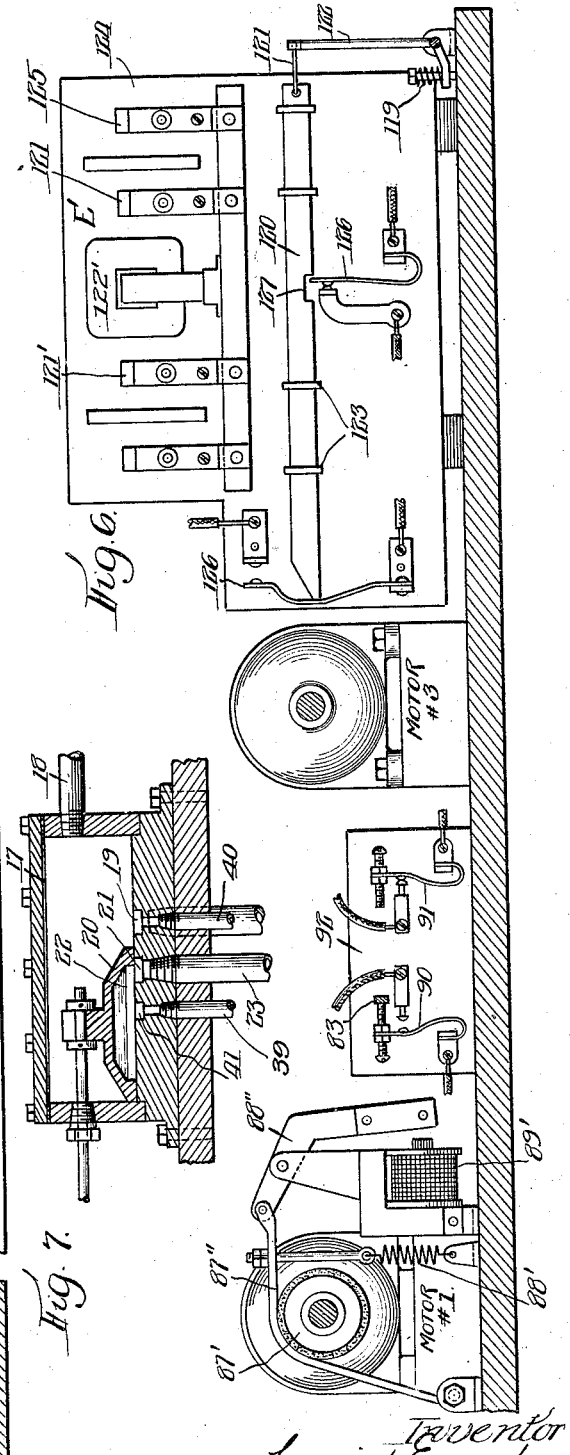

May 24, 1932. L. EGGERT 1,860,022
CONTROL SYSTEM AND APPARATUS
Filed Aug. 30, 1929 6 Sheets-Sheet 6
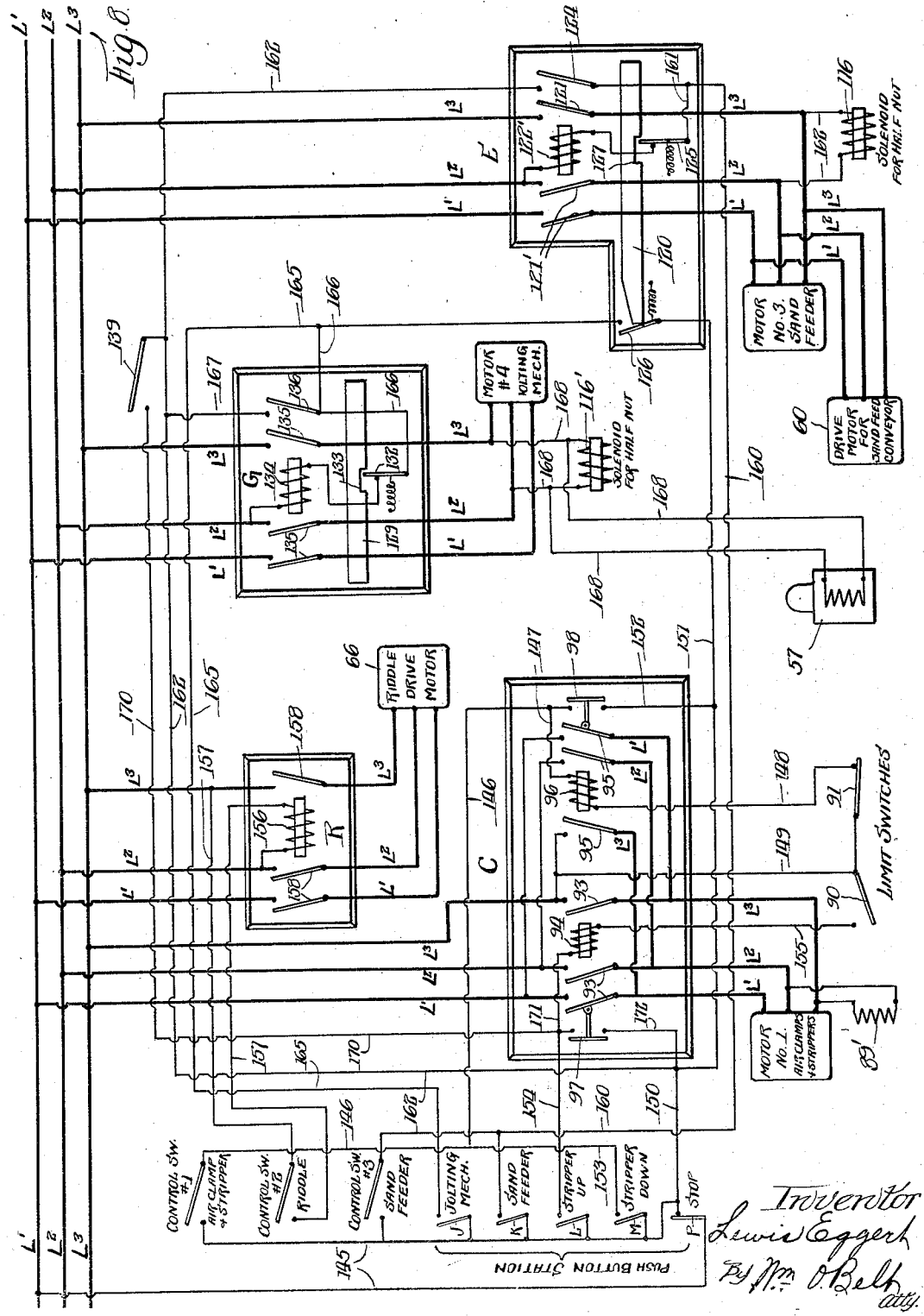

Patented May 24, 1932

1,860,022

UNITED STATES PATENT OFFICE

LEWIS EGGERT, OF TOLEDO, OHIO

CONTROL SYSTEM AND APPARATUS

Application filed August 30, 1929. Serial No. 389,392.

My invention relates to improvements in control systems for molding machines.

The principal object of my invention is to provide an improved system for automatically controlling a plurality of operating mechanisms in such manner that the various operations will occur in proper sequence and will continue for predetermined periods of time.

A further object is to enable an operator at any stage in the automatic routine of operations of the mold making mechanisms to take control of any one of the operations for the purpose of prolonging that operation, and to then restore the system to automatic control for subsequent operations.

A further object is to provide improved timing mechanism which will automatically regulate the duration and sequence of the several operations of the molding mechanisms.

Other objects of my invention will appear hereinafter.

Fig. 2 is an enlarged vertical section of the jolting mechanism and the strippers and air operated mold clamps shown in Fig. 1;

Fig. 2a is a detail plan of a portion of the mold and one of the mold clamps;

Fig. 2b is a detail of the mold clamp;

Fig. 3 is a perspective of the riddle, the riddle support, and the controlling switches operated thereby;

Fig. 3a is a detail of a switch actuating device on the riddle support;

Fig. 3b is a detail of a similar switch actuating device;

Fig. 3c is a detail view of a portion of the riddle support;

Fig. 4 is an enlarged plan of the panel box containing the control mechanism and electromagnetically operated switches;

Fig. 5 is an elevation in the direction of the arrows on the line 5—5 of Fig. 4;

Fig. 5a is a detail of the half-nut operating device on the timing mechanism taken substantially on the line 5a—5a on Fig. 4;

Fig. 6 is an elevation looking in the direction of the arrows on the line 6—6 of Fig. 4;

Fig. 7 is a detail section of the slide valve on the line 7—7 of Fig. 4 and

Fig. 8 is a diagram of the control circuits for the several operating mechanisms;

Figure 1:
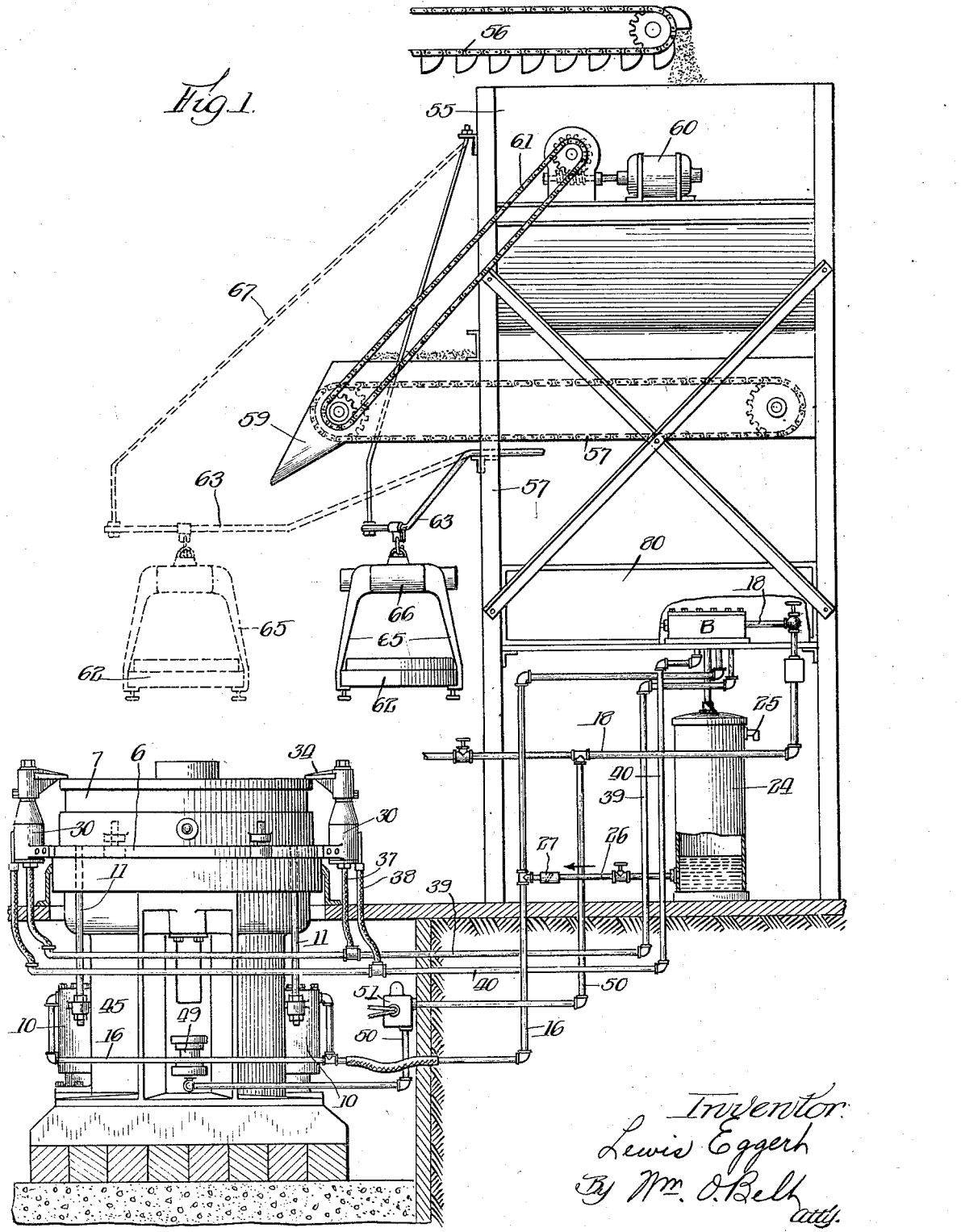
Fig. 1 is a general view in elevation of a mold making mechanism the operations of which are adaptable for control by my invention.

Referring more particularly to Figs. 1 and 2 I have shown a molding machine adapted especially for making molds for casting car wheels. In a machine of this character the pattern 5 is removably mounted in a horizontal position on the table of a jolting or jarring mechanism which bumps the mold up and down to pack the sand around the pattern. The drawings show the cope section of a mold. In practice the cope section of the mold is shown made in one machine and the drag section is made in another machine, and the two sections are afterwards placed together by suitable handling machinery to form a complete mold.

The pattern 5 of the car wheel is generally made of metal and is secured to or formed integrally with a mold board or plate member 6, the surface of which forms the parting line of the mold. The mold plate is substantially circular in form and extends beyond the pattern sufficiently to form a shoulder or flange upon which the flask 7 is placed. The flask is also circular in shape and has a plurality of radial ribs which support a central gate member 7'. The flask is sufficiently larger in diameter than the pattern to provide room for the sand 8 from which the mold is made. In practice the flask is brought to the molding machine and placed in position on the mold plate by any suitable or well kown handling mechanism. In like manner the mold when completed is removed from the machine by suitable handling mechanisms.

After the various operations have been performed the completed mold, including the flask, is stripped from the pattern by lifting or elevating it vertically to separate it from the pattern. This is accomplished by the strippers 10 which are positioned beneath the table of the jolting mechanism.

In the machine shown there are two of these stripers positioned diametrically opposite each other. Each stripper has a pair of stripper pins or rods 11 which extend upwardly through guide openings in the table and pattern plate 6 to engage the under edge of the flask 7, Figs. 2 and 2a. The stripper pins are fastened to ears 12 on a crosshead on the vertically movable plungers 13 which operate in the stationary cylinders 14 mounted on the base of the machine. The strippers are operated by means of oil, pressure being applied to the oil by air under pressure. The stripper plungers or pistons are hollow and filled with oil and their lower ends have ports 15 through which the oil is forced into the cylinder chambers beneath the plungers to elevate said plungers. The supply pipe 16 communicates with the interior of the plungers at their upper ends and are connected to a source of compressed air.

After the strippers have been operated to elevate the completed mold and the mold has been removed, the strippers are permitted to remain in their elevated position to receive the next flask. They are then operated to lower the flask into position on the mold plate ready for the next cycle of molding operations. Air pressure for operating the strippers is controlled by a motor driven slide valve B, Figs. 1, 4 and 7, mounted in the control panel box and forming part of the control system hereinafter described.

This valve, Fig. 7, comprises a suitable chest or box 17 connected by means of the pipe 18 to a suitable source of compressed air. The pipe 16 extends from the stripper cylinders to a port 19 in the bottom wall of the valve chest. This port is covered or uncovered by a slide valve member 20 which also controls an exhaust port 21, a chamber 22 being provided in the valve member 20 for connecting the ports 19 and 21. When the slide valve member 20 is in the position shown in Fig. 7 the port 19 is open to air under pressure from the supply thereof and the strippers will be operated to elevate the mold. When the slide valve member is moved to the right of its position shown in Fig. 7, it closes off the port 19 from the air supply and instead connects said port with the exhaust port 21, whereupon the weight of the flask on the strippers moves the stripper plungers downwardly and forces the air from the system through the exhaust, thus lowering the flask on to the mold plate. The exhaust pipe 23 leads from the exhaust port 21 into the top of a reservoir tank 24 and this tank has a discharge port 25 through which the air is exhausted to the atmosphere. Any oil which is carried back to the lines from the stripper cylinder, however, is accumulated in the tank 24 and is not washed. The lower portion of this tank is connected by a pipe 26 to the pipe 16 leading to the stripper cylinder Fig. 1. The tank is positioned above the cylinder so that the oil which is accumulated in the tank flows back to the stripper cylinder when the strippers are idle during periods between molding operations, thereby maintaining the strippers completely full of oil at all times. A check valve 27 is placed in the line 26 to prevent oil from being forced back into the tank 24 through the pipe 26 when air is admitted to the lines 16 to elevate the strippers. The means just described for preventing the waste of oil and for maintaining the strippers full of oil, constitute the subject matter of my co-pending application Serial No. 389,394 of even date herewith.

After the flask is placed in position on the mold plate and lowered to the mold plate it is clamped in this position during the process of making the mold, and released after the mold is completed so that the completed mold can be removed. This clamping mechanism constitutes the subject matter of my co-pending application Serial No. 389,393 of even date herewith. The clamping mechanism is arranged to engage the flask at two substantially diametrically opposite points. Air cylinders 30 are attached to the edge of the mold plate 6, Figs. 1, 2, 2a and 2b. The cylinders have pistons 31 vertically movable therein, and both ends of the cylinders are closed so that air pressure admitted below the pistons forces the pistons upwardly, and when admitted above the pistons the pistons will be forced downwardly. The cylinder structures are reduced at their upper ends 32 to form guides for the enlarged ends 33 of the piston rods. The clamping arms 34 are secured to the upper ends of the piston rods and extend laterally sufficiently to engage the upper edge of the flask and clamp the flask firmly against the mold plate. The clamp arms have inverted cup shaped members 34' which surround the upper end portions 32 of the cylinder structures and which have pins 35 engaging cam slots 36 in said upper portions 32. These pin and cam slot connections are so related that when the clamp arms move upwardly they will rotate a quarter turn, Fig. 2a, which swings them clear of the flask. Upon the lowering of the clamps, the clamp arms swing back into position to engage the flask. The lower ends of the cam slots, Fig. 2b, are disposed vertically to permit direct vertical movement for clamping purposes when the clamp arms are in clamping position. The upper and lower chambers of the cylinders are connected by flexible connections 37 and 38 to the air pipes 39 and 40. The pipe 39 leads to a port 41, Fig. 7, in the slide valve B and the pipe 40 leads to a port 42 in said valve. The several ports in the valve are so related to the slide valve member that the ports 19 and 42 will be connected to the exhaust port 21 and thereby relieve the stripper cylinders and the lower chambers of the air clamp cylinders slightly before the port 41 is uncovered to admit air to the upper chambers of the clamp cylinders. In like manner the slide valve member 20 exhausts air from the upper clamp chambers through port 41 before admitting pressure to the ports 19 and 42. Timing of the operation of the slide valve in this manner delays the operation of the clamps until the flask has been lowered onto the mold plate, and vice versa, releases the clamps before the strippers operate to elevate the mold.

The jolting mechanism may be of any suitable type employed in molding operations of this character. The jolting mechanism shown in the drawings, Figs. 1 and 2, is of a type which is operated by air pressure. It comprises a cylinder 45 and a plunger 46 vertically movable therein. The plunger carries the supporting table 47 at its top upon which the pattern plate and mold are mounted. When air pressure is admitted to the cylinder below the piston, the piston is raised and when the air pressure is cut off and the cylinder exhaust to atmosphere the plunger drops of its own weight and that of the mold, striking a plurality of jarring disks 48 mounted in the frame of the mechanism. These jolting or bumping operations are repeated in rapid succession to pack the sand around the pattern of the mold. The jolting or jarring operations are governed by an automatic air valve 49, Fig. 1, and continued as long as air pressure is admitted to the valve 49. The control valve 49 and the jolter cylinder are connected by the pipe line 50 to the main air supply pipe 18 and the air supply thereto is controlled by a solenoid operated valve 51, the operation of which is controlled by timing mechanism hereinafter described, for the purpose of determining the duration of time of operation of the jolting mechanism.

The sand for the mold is contained in a hopper 55 which is kept supplied with sand by a conveyor 56 or any other suitable mechanism for the purpose. The hopper is mounted in the upper portion of a supporting frame 57 above the molding machine. A horizontal sand feeding conveyor 58 is positioned in the frame beneath the hopper, and the forward end of this conveyor is disposed over the molding machine in such a manner that the sand will drop into the mold. The conveyor has a discharge chute 59 for properly guiding the sand into the mold. The conveyor is driven by a motor 60 through the medium of the drive chain 61. The quantity of sand deposited into the mold is determined by the length of time of operation of the conveyor.

A riddle, Figs. 1 and 3, 3a, 3b and 3c is suspended from the outer end of a supporting arm 63 which is pivoted at 64 on the frame 57 in such manner that the riddle can be swung to and from a position over the mold. This riddle may be of any suitable or well known type for the purpose. The one shown consists of the riddle screen 62 supported by a yoke frame 65, in the upper portion of which is a motor 66 adapted to vibrate or shake the riddle to screen the sand which is first sifted into the mold. The riddle sand is usually kept in a pile alongside the molding machine and the operator usually deposits a shovel full or two of sand into the riddle while the riddle is out of position. He then swings the riddle to a position over the mold, the riddle is operated to sift its charge of sand into the mold, and the riddle is then swung out of position prior to discharging molding sand from the conveyor 58. The outer end of the riddle arm is supported by a diagonal brace 67 which is also pivoted on the frame to strengthen the arm for supporting the weight of the riddle. The riddle supporting arm, when it is out of position, is yieldingly held by a spring clip 68, Fig. 3c, mounted on the frame to prevent accidental movement of the arm.

The riddle arm, in its movement into and out of position, is arranged to operate a plurality of control switches which are designated in Figs. 3 and 8 as control switches Nos. 1, 2 and 3. These switches are mounted on the frame 57 to be engaged by the arm 63 in various positions to which the arm is swung. These switches may be of any suitable type. Those shown in the drawings are contained within suitable covers or enclosures and have rollered operating arms 69, 70 and 71 respectively. Switch #1 is mounted on the frame and is operated immediately upon the movement of the riddle arm toward its position over the mold. The arm 63 has a short arm 72 having its end turned down to form a stop for a pivoted detent 73. When the riddle arm begins its movement toward position, the detent engages the rollered arm 69 and operates the switch. On the return movement of the arm, however, the detent swings about its pivot and rides over the switch arm without operating the switch. Switch #1 closes the circuit, as hereinafter described, which brings the stripper and clamping mechanism into operation.

Control switch #2 is similar to switch #1 in construction and is positioned near the pivot 64 of the riddle arm. The riddle arm has a projection 74 which engages the arm 70 of the switch just as the riddle reaches its position over the mold, as indicated by the dotted lines of the riddle arm 63, Fig. 3. Switch #2 closes a circuit which brings the riddle motor 66 into operation, and this switch will be held closed as long as the operator maintains the riddle in a position over the mold.

Control switch #3 is similar in construction to switches #1 and #2 and is operated by a pivoted detent 75, Figs. 3 and 3b, on the extension 76 of the riddle arm. Switch #3 is so positioned that as the riddle arm is swung towards position over the mold the detent rides over the switch arm 71 without operating said switch. On the return movement of the riddle arm, however, towards its idle or normal position, the detent actuates the switch #3 and closes a circuit which starts the operation of the sand feeding conveyor. Control switch #3 is located so that it is actuated by the riddle arm on its return movement just after the projection 74 moves out of engagement with the arm of switch #2 whereby the riddle motor will be stopped and the operator can swing the riddle out of the way of the sand discharged from the sand feeding conveyor.

The control panel 80 is mounted on the frame 57 and is provided with a suitable cover which encloses the mechanism contained therein and protects it from dirt and damage. Within this panel enclosure is contained the timing mechanism for determining the duration of time of the several operations hereinbefore described, together with the electromagnetically operated switches for controlling the timing mechanisms. Referring more particularly to Figs. 4, 5 and 6 the slide valve B, which controls the air for the clamps and strippers, is operated by a timing device in the panel box 80. The valve member 20 has an operating rod 81 which is connected to and operated by a yoke mounted to slide longitudinally on the parallel guide rods 82. This yoke consists of parallel cross members 83 and 84 which are rigidly connected together by the parallel rods 85. The cross member 84 is threaded on a screw 86 to travel back and forth along this screw when the screw is rotated. The screw is carried on the shaft 87 which is driven in either direction by a motor hereinafter referred to as motor #1, the shaft being driven through the medium of a suitable reduction gear 88. The outer end of the shaft is supported in a suitable bearing 89. When motor #1 is driven in one direction the yoke travels lengthwise outwardly on the screw and operates the slide valve member in one direction, and when the motor is reversed the yoke travels in the reverse direction on the screw and slides the valve member 20 in the opposite direction. At the ends of its strokes the yoke engages and operates the limit switch contacts 90 and 91, the cross members 83 being provided with an extension which engages the adjustment screws on said limit switches, Figs. 4 and 7. These limit switches are mounted on a suitable supporting member 92 on the panel. When the parts are in normal position as shown in Figs. 4 and 7 the limit switch contacts 90 are normally held open and the contacts 91 normally closed. Shifting the yoke to the other limit of its stroke closes contacts 90 and opens contacts 91.

The length of time required for the yoke to travel on the screw 86 determines the duration of operation of the slide valve and is sufficient to permit the operation of the clamps and strippers.

Motor #1 has a brake drum 87' against which a brake band 87" is normally held by the spring 88'. The band is connected to a release lever 88" which is operated by an electromagnet 89'. The magnet is energized when the motor is started and de-energized when the motor is stopped. The purpose of this brake is to quickly stop the movement of the yoke and slide valve and prevent their overrunning the ends of their strokes.

The circuit for motor #1 is established through the contacts of an electromagnetically operated reversing switch C mounted in the control panel. This switch has two sets of contacts. One set of switch contacts 93 is operated by the electromagnet 94 to connect the motor with the source of power for operating the motor in one direction. The other set of contacts 95 is operated by the electromagnet 96 to reversely connect the motor with the source of power to operate the motor in the opposite direction. Switch contacts 97 and 98 are also operated by the electromagnets 94 and 96, respectively to establish holding circuits for these respective electromagnets, as hereinafter described.

The duration of time of operation of the sand feeding conveyer is controlled by the timing device D which is driven by the control motor designated as motor #3. This motor drives, through a reduction gearing 100, a hollow shaft 101, the end of which is mounted in a suitable bearing 102. Aligned with this shaft is a screw 103 having extensions 104 and 105 at its ends. The bore of the shaft 101 is square in section to receive the squared end 106 of the extension 104 so as to form a driving connection between the screw and shaft which will permit the screw to shift longitudinally. The other extension 105 of the screw slides in a suitable bearing 107 and at its outer end carries a cross member 108 which is guided on the guide rod 109. This cross member 108 is connected by the cables 110 to a pair of weights 111, Fig. 5, the cables pass around the pulleys 112 and 112' on the brackets 113. These counter weights act to restore the screw to its normal or retracted position when it is released. The screw is caused to travel longitudinally by a half-nut or threaded member 114, Fig. 5a, which is pivoted at 114' so that it can be swung into and out of engagement with the screw. This half-nut has a threaded portion which embraces a portion of the circumference of the screw and a plurality of slots extend longitudinally of the screw and intersect the threads to prevent a vacuum existing between the threads of the nut and the screw which would otherwise tend to prevent the release of the half-nut. The half-nut is normally held out of engagement with the screw by a spring 115 and is adapted to be brought into engagement with the screw by the solenoid 116 when energized.

When the screw reaches the outer limit of its stroke the end of the extension 105 strikes an adjustable stop screw on the stop arm 117 which is mounted on a horizontal rock shaft 118 and which is yieldingly held in its normal position by a spring 119, Figs. 5 and 6. When the screw extension strikes the stop 117 it swings the rock shaft 118 and operates a slide bar 120 which is connected at its end to the rock shaft by means of the link 121 and the upstanding arm 122 on the shaft. This slide bar is mounted to slide longitudinally in guides 123 on an upstanding panel support 124. This slide bar is arranged to operate two switches 125 and 126. In its normal position the end of the bar engages the switch 125 and holds this switch normally open. A notch 127 is arranged to engage the normally closed switch 126 and open this switch. When the bar is shifted the switch 125 is arranged to close slightly before the switch 126 opens.

The connection of motor #3 to the line or source of power is established by the electromagnetically operated switch E which has contacts 121' operated by the electromagnet 122', Fig. 4. This magnet also operates switch contacts 125 which closes a holding circuit for itself.

The duration of time of operation of the jolting or jarring mechanism is controlled by a timing device F which is constructed and operates exactly like the timing device D just described. The timing device F is driven by motor #4 and operates a screw 103' which is engaged by a half-nut 114' operated by solenoid 116'. The screw is returned to normal position by the weight 111' and cables 110'. The rock shaft 128, however, which corresponds to the rock shaft 118 of timing device D, is connected to a slide bar 129 by means of the link 130, Fig. 5, mounted on another upstanding panel 131. This slide bar 129 operates only the one switch 132 by means of its notch 133 and this switch controls the circuit of the operating electromagnet 134 of an electromagnetically operated switch G similar to the switch E. The switch G has switch contacts 135 which are operated by the electromagnet 134 to establish connection of motor #4 to a line or source of power. It also has a fourth switch contact 136 controlling a holding circuit for itself.

The cross member 108' of the timing device F is extended laterally and carries a pivoted detent 137 which rides over the arm 138 of a normally open switch 139 on the forward longitudinal movement of the screw 103'. On the return stroke of screw 103', however, and just before it reaches its normal position the detent 137 engages the member 138 and closes switch contacts 139. The closure of this switch starts motor #1 operating in the reverse direction to restore its screw 86 to normal position and bring about the operation of the strippers and air clamps to release the finished mold and strip the mold from the pattern.

The sequence and duration of the various operations and the control of these operations will now be described with reference more particularly to Fig. 8. In addition to the automatically operated switches, a push button station is provided for the operator. This push button station is shown at the left hand of Fig. 8 and comprises a plurality of push button switches placed in a position convenient for the operator. These switches are designated J, K, L, M, and P and are arranged so that the operator can take control and prolong any of the operations beyond the duration automatically determined by the timing devices. The source of current is represented by the lines L1, L2, and L3 which indicate a three phase alternating current system. All of the control switches and push button switches with the exception of the push button P are normally open and are connected to the line wire L1 by means of the conductor 145. The push button switch P is normally closed and is included in this conductor 145 so that upon the operation of this push button P by the operator the entire control circuit can be opened and all of the mechanism stopped at any stage.

Assume that a flask has been placed on the strippers. The operator swings the riddle from its normal position, and control switch #1 is immediately closed. This completes a circuit as follows: conductor 145, control switch #1, conductors 146 and 147, switch magnet coil 96, conductor 148, limit switch 91, conductor 149, to L3 of the line. Switch magnet 96 closes the switch contacts 95 and closes the line circuit directly to motor #1. Motor #1 rotates the screw 86 and advances the yoke along said screw. This slides the valve member 20, opening the stripper cylinders to the atmosphere and admits air to the upper chambers of the clamp cylinder whereupon the strippers lower the flask onto the mold plate, and the clamps operate to clamp the flask in position. The switch magnet 96 also closes the switch contacts 98 and completes a holding circuit for itself as follows: conductor 145, push button P, conductors 150, 151 and 152, to conductor 147, thus forming a shunt around control switch #1. Motor #1 continues to operate until the yoke reaches the limit of its stroke and opens limit switches 91, thus breaking the circuit through switch magnet 96, causing the switch contacts 95 to open and stop the motor #1. In starting its movement along the screw 86, the yoke allows limit switch 90 to close but this simply prepares the circuit for magnet coil 94 for later operation.

If the operator desires to start the motor #1 and operate the strippers and clamping mechanism downwardly independently of the control switch #1 he simply presses push button switch M which closes a shunt circuit around the control switch #1 as follows: conductor 145, push button switch M, conductor 153 to conductor 146 thus closing the circuit for the magnet 96 which operates as above described to start motor #1. After having reached the limit of its movement along the screw 86, and having thereby opened the limit switch 91 and stopped motor #1, the yoke and slide valve member 20 remain in that position until the finished mold is to be released from the clamps and elevated by the strippers.

Normally the operator would continue swinging the riddle arm until the riddle reached a position over the mold, whereupon the riddle arm would operate control switch #2 to start the riddle motor. However, if the operator should desire to prolong the period of time between the operation of the strippers and the riddle, he can do so by simply refraining from swinging the riddle arm far enough to operate control switch #2. Furthermore, if during this prolonged period the operator should desire to release the air clamps and operate the strippers to elevate the flask he can do so by pressing the push button L. This closes a circuit for the switch magnet 94 as follows: conductor 145, push button switch L, conductor 154, magnet coil 94, conductor 155, limit switch 90, conductor 149, to line L3. Switch magnet 94 closes contacts 93, completing circuit of motor #1 to drive said motor in the reverse direction. This rotates screw 86 in the reverse direction and returns the yoke to normal position, operating the slide valve member 20 to release the air clamping mechanism and elevate the strippers. This movement of the yoke closes the limit switch 91 and opens limit switch 90.

Returning again to the normal operation of the mechanism and assuming that the operator has swung the riddle arm, operating the control switch #1 to clamp the flask on the mold plate, he may continue to swing the riddle arm until the riddle reaches its position over the mold and the riddle arm closes control switch #2. This completes the circuit for the electromagnetically operated switch R which connects the riddle motor to the line, as follows: Line L3, conductor 157, control switch #2, magnet 156, to line L2. Switch magnet 156 closes the switch contacts 158 and completes the circuit for the riddle motor 66 directly to the line. The riddle drive motor 66 will continue to operate as long as the operator keeps control switch #2 closed by holding the riddle in its position over the mold.

When he finishes the riddle operation the operator swings the riddle out of position and returns it to normal position with the arm 63 in engagement with the spring clips 68. During this return movement the control switch #3 is closed by the detent 75, as previously described. This completes a circuit for the sand feeding conveyor mechanism, as follows: conductor 145, control switch #3, conductor 160 and 161, switch contacts 125, magnet coil 122′ of switch E, to line L2. Magnet 122 closes switch contacts 121′ and connects the line L1, L2 and L3 directly to mold #3 starting the operation of said motor. The switch magnet 122′ also closes switch contacts 124 which completes a holding circuit around control switch #3 as follows: conductor 145, push button P, conductor 150 and 162 to conductor 161. The drive motor 60 for the sand feed conveyor is also started into operation because it is bridged across the line in parallel with motor #3. The solenoid 116 which operates the half-nut 114, as previously described, is also bridged across lines L2 and L3 by the conductor 162. Motor #3 drives the screw 103 and the sand conveyor will continue to discharge sand into the mold until the screw strikes the stop 117 and opens switch contacts 125, thus opening the circuit for switch magnet 122′ whereupon the contacts 121′ are open and motors #3 and #60 are stopped and the half-nut 114 disengaged from the screw. Disengaging the half-nut from the screw releases the screw and permits the counter weights to instantly return the screw to its normal position, thereby again closing the switch contacts 125 and opening switch contacts 126.

The bar 120 is so related to switches 125 and 126 that it closes switch 126 slightly before its notch 127 engages and opens switch 125. The closure of the switch 126 closes a circuit for the electromagnetic switch G which controls the jolting mechanism. However, before describing the control of the jolting operation let us assume that the operator wishes to prolong the feeding of sand beyond the period of time determined by the timing device just described. To do this he first presses the stop button P to open the control circuit and prevents the switch G from closing its holding circuit. He then releases stop button P and presses the push button K which closes the circuit for the switch magnet 122′ as follows: conductor 145, push button switch K, to conductor 160 thence over the same circuit previously closed by the control switch #3. This again energizes switch magnet 122′ closing switch contacts 121′ to start motor #3 and the drive motor 60 for the sand conveyor. Although he may thus continue the operation of the sand feeding mechanism indefinitely by the operation of the push buttons P and K as just described, he is not likely to do so because he would not need a second full charge of sand. Instead he allows the sand conveyor to run until a small additional quantity of sand is discharged into the mold and then stops the sand conveyor by pressing the stop button P which opens the circuit to the switch magnet 122' thereby de-energizing solenoid 116 and releasing the screw 103 which returns to normal position. During this second sand feeding operation the screw 103 may not have completed its full stroke to operate the bar 120 hence the switch 126 would not be closed and the jolting mechanism would not be started automatically. Therefore, in order to start the jolting mechanism the operator would press the push button J completing a circuit for the magnet of switch G as follows: conductor 145, push button switch J, conductors 165 and 166, switch contacts 132, magnet coil 134 to line L2. This magnet closes contacts 135 which completes the line circuit connections lines L1, L2 and L3 directly to motor #4 of the jolting operation and timing device. Magnet 134 also closes switch contacts 136 which completes a holding circuit for itself around both the push button J and the switch 126 as follows: conductor 145, push button P, conductors 150, 162 and 167, switch contacts 136, to conductor 166. The closure of the contacts 135 also energizes the solenoid 116' for the half-nut and the solenoid for air control valve 57 because both of these solenoids are bridged across lines L2 and L3 by the conductors 168. This admits air pressure to the jolting mechanism and starts the operation of the jolting mechanism. The duration of time of this jolting mechanism is automatically determined by the time required for the screw 103' of the timing device F to reach the outer limit of its stroke. When the screw 103' does reach the limit of its stroke it strikes the stop arm 117' and operates bar 129. The notch 133 opens switch contacts 132 and breaks the circuit for magnet 134 thus releasing the contacts 135, stopping the motor #4 and de-energizing control valve solenoid 157 which stops the jolting operation. Solenoid 116' being thus de-energized releases the screw 103' and permits its instant return by the weights 111'. On the return stroke of the yoke 103' the switch 139 will be momentarily closed which completes the circuit for the magnet 94 of electromagnetically operated switch as follows: conductor 145, push button stop P, conductors 150 and 162, switch 139, conductors 170 and 171, magnet 94, conductor 155, limit switch 90, conductor 149 to line L3. The holding circuit for the magnet 94 is completed as follows: conductor 145, push button P, conductor 150, conductor 172, switch contacts 97, conductor 171 to magnet 94. Magnet 94 closes contacts 93 and starts motor #1 in the reverse direction. This restores the screw 86 to normal position and operates slide valve member 20 to admit air to the stripper cylinder and clamps to release the clamps and elevate the complete mold. The complete mold is then removed from the stripper pins and a new flask placed on said stripper pins. The cycle of operations may then be repeated.

If the operator wishes to prolong the operation of the jolting mechanism beyond the time automatically determined by the timing device he can do so by simply pressing the push button J which closes the circuit for the switch magnet 134 as already described. In the event that he does prolong the operation of the jolting mechanism for a short time but not long enough to permit the screw 103' of the timing device to reach the limit of its stroke, the switch 139 would not be operated to release the clamps and elevate the strippers, but the operator can accomplish this operation simply by pressing the push button L.

It is thus seen that with my improved control mechanism the several operations in the process of making a mold are definitely controlled. The duration of time of each operation and the sequence in which the operations are performed are definitely and automatically determined. The operator, however, at any stage of the cycle of operations can prolong any one of the operations and then restore the system to automatic control for the remaining operations.

I claim:

1. In a control system of the class described, the combination of a sand feeding mechanism, a jolting mechanism, means controlling the operations of said mechanisms in sequence, and timing mechanism for determining the duration of operating time of one of said mechanisms before the commencement of operation of the other mechanism.

2. In a control system of the class described, a control member, means for moving said control member in one direction, a plurality of translating mechanisms, timing devices for controlling the operation of said translating mechanisms, means for returning one of said timing devices to original position after operation thereof whereby said means for moving said control member will be operated in a direction opposite to the first operation to reposition said control member in original position.

3. In a control system of the class described, a plurality of translating mechanisms operable in a determined sequence, and a timing device operable in one direction at the start of the sequence of operations and operable in the other direction at the end of said sequence of operations.

4. In a control system of the class described, a plurality of translating mechanisms operable in a determined sequence, timing devices for regulating the period of operation of each of said translating mechanisms, and means for operating one of said timing devices in one direction at the start of a sequence of operations and in the other direction at the end of a sequence of operations to thereby control the starting and stopping of the sequence of operations.

5. In a control system of the class described, a plurality of translating mechanisms operable in a determined sequence, timing devices for regulating the period of operation of each of said translating mechanisms, means for operating one of said timing device in one direction at the start of a sequence of operations and in the other direction at the end of a sequence of operations to thereby control the starting and stopping of the sequence of operations, and means for rendering the timing means inoperative to prolong the period of operation of any of said translating mechanisms.

6. In a control system, the combination of a plurality of translating mechanisms operable in a determined sequence, starting means operable to begin the sequence of operations, means for starting the operation of one of said mechanisms upon the cessation of operation of another of said mechanisms, and means for operating said starting means at the end of a sequence of operations to end the sequence of operations.

7. In a control system, the combination of a plurality of translating mechanisms operable in a determined sequence, means for starting the operation of one of said mechanisms upon the cessation of the operation of the preceding of said mechanisms, timing means associated with each of said mechanisms for determining the period of operation of its respective mechanism, starting means operable to begin the sequence of operations, and means for operating said starting means at the end of a sequence of operations to end the sequence of operations.

8. In a control system of the class described the combination of a jolting mechanism, a sand riddle, means for swinging said riddle into and out of position, means for controlling the operation of said jolting mechanisms, and means operated by the swinging of said riddle into position for rendering said controlling means operative.

9. The combination of a mold supporting mechanism, means for clamping a mold on said supporting mechanism, a riddle movable into and out of position with respect to the mold, and means operated when the riddle is moved into position for controlling the operation of said clamping means.

10. The combination of a mold supporting mechanism, means for clamping a mold on said supporting mechanism, a riddle movable into and out of position with respect to the mold, means operated when the riddle is moved into position for controlling the operation of said clamping means, and means for releasing said clamping means.

11. In a control system of the class described the combination of a mold supporting mechanism, means for feeding sand to the mold and for jolting the mold, a sand riddle movable into and out of position with respect to the mold, means for controlling the operation of said sand feeding and jolting means, and means operated when the riddle is moved out of position for rendering said controlling means operable.

12. In a control system of the class described the combination of a plurality of operating mechanisms, a plurality of timing devices controlling the duration of time of operation of said mechanisms, an independent motor for operating each of said timing devices, and means controlled by one of said timing devices and operable upon the cessation of operation thereof for starting the motor of another timing device.

13. In a control system of the class described the combination of a plurality of operating mechanisms, a plurality of timing devices controlling the duration of time of operation of said mechanisms, an independent motor for operating each of said timing devices, means controlled by one of said timing devices and operable upon the cessation of operation thereof for starting the motor of another timing device, and means independent of the timing devices for controlling the operation of said motors.

14. In a control system, the combination of a plurality of translating mechanisms operable in a determined sequence, means for starting the operation of one of said mechanisms upon the cessation of the operation of the preceding of said mechanisms, timing means associated with each of said mechanisms for determining the period of operation of its respective mechanism, starting means operable to begin the sequence of operations, means for operating said starting means at the end of a sequence of operations to end the sequence of operations, and means for controlling the operation of any one of said mechanisms independently of said timing means.

15. In a control system of the class described the combination of mold stripping and clamping mechanism, sand feeding mechanism, and jolting mechanism, each adapted to be operated in relative sequence, means for starting the operation of each mechanism in its proper sequence and upon the cessation of operation of a preceding mechanism, and timing means for determining the duration of operation of each of said mechanisms.

16. In a control system of the class described the combination of a plurality of pneumatically operated mechanisms, a source of air pressure for said mechanism, means controlling the air from said source to said mechanisms, electro-magnetically operated switches for controlling said air controlling means, a plurality of timing devices controlling said switches, and means automatically operable upon the cessation of one timing device for starting the operation of another timing device.

17. In a control system of the class described the combination of a plurality of pneumatically operated mechanisms, a source of air pressure for said mechanism, means controlling the air from said source to said mechanisms, electromagnetically operated switches for controlling said air controlling means, a plurality of timing devices controlling said switches, means automatically operable upon the cessation of one timing device for starting the operation of another timing device, and manually operated means for independently controlling said switches.

18. The combination of a motor operated riddle, a movable support for carrying the riddle into and out of operating position, and means operated by said support in its movement for controlling the operation of the riddle motor.

19. The combination of a motor driven riddle, a movable support for carrying the riddle to and from its operating position, and a switch actuated by the support in its movement for controlling the riddle motor.

20. The combination of a motor operated riddle, a movable support for carrying the riddle into and out of operating position, means operated by said support in its movement for controlling the operation of the riddle motor, a molding machine, sand feeding mechanism for supplying sand to said molding machine, and means operated by said riddle support in its movement for controlling the operation of said molding machine and said sand feeding mechanism.

21. The combination of a motor operated riddle, a movable support for carrying the riddle into and out of operating position, means operated by said support in its movement for controlling the operation of the riddle motor, a molding machine, sand feeding mechanism for supplying sand to said molding machine, means operated by said riddle support in its movement for controlling the operation of said molding machine and said sand feeding mechanism, and timing mechanism for determining the duration of operation of said sand feeding mechanism and said molding machine.

22. The combination of a plurality of fluid operated mechanisms, timing mechanisms for controlling said fluid operated mechanisms, means for starting one of said timing mechanisms in operation, and means controlled upon the cessation of said timing device for starting another timing device in operation.

23. The combination of a fluid operated mechanism and means controlling the operating of said fluid operated mechanism comprising a longitudinally movable screw, means for rotating said screw, means operable by engagement with the screw to compel its longitudinal movement while the screw rotates, means for returning the screw longitudinally to normal position on the release of said engaging means, and a switch operated by the screw in its longitudinal movement for controlling the screw driving means.

24. The combination of a longitudinally movable screw, a motor for rotating the screw, an electromagnetically operated device adapted to engage the screw and compel its longitudinal movement in one direction when the screw is rotated, means for returning the screw longitudinally to normal position when released from said device, and a switch operated by said screw for controlling said electromagnetically operated device.

25. The combination of a longitudinally movable screw, a motor for rotating the screw, a member adapted when engaged with the screw to compel the longitudinal movement of the screw in one direction, means operable when said member is disengaged from the screw to return the screw to normal position, an electromagnet for operating said member, and means operated by the screw in its longitudinal movement for controlling said electromagnet.

26. The combination of a motor driven shaft, a screw adapted to be rotated by said shaft and to move longitudinally thereof, a half-nut adapted to engage said screw and cause its movement longitudinally in one direction, an electromagnet for operating said half-nut to compel the screw to move longitudinally in one direction, and means operable when the screw reaches the limit of said movement for controlling the screw longitudinally to normal position when disengaged by said half-nut.

27. The combination of a plurality of fluid operated mechanisms, a plurality of electromagnetically operated switches controlling said mechanisms, means for controlling said switches to operate said mechanisms in a predetermined sequence, and timing mechanism for determining the duration of operation of each of said mechanisms.

LEWIS EGGERT.